E. BUSSEY.
Stove-Oven.
No. 200,975. Patented March 5, 1878.
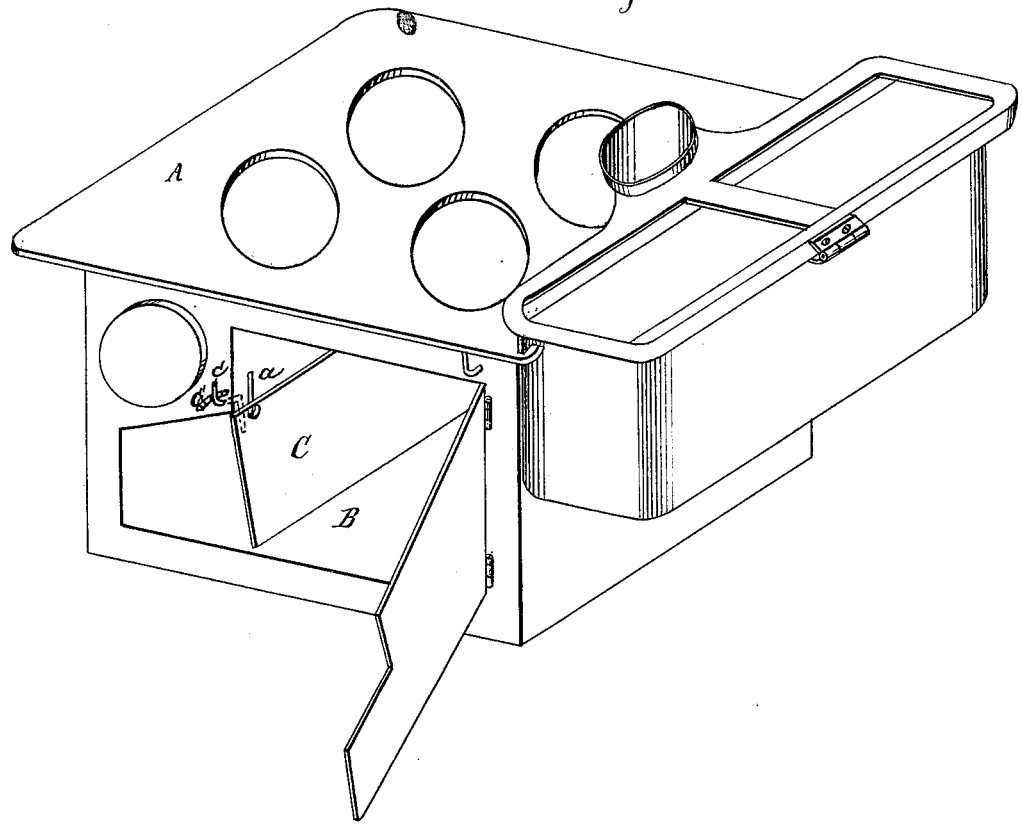
Witnesses
J. A. Tauberschmidt
P. McNickle.
Inventor
Ezek Bussey
by L. Deane, atty.
N. PETERS, PHOTO-LITHOGRAPHER, WASHINGTON, D C.

UNITED STATES PATENT OFFICE.

ESEK BUSSEY, OF TROY, NEW YORK, ASSIGNOR OF ONE-HALF HIS RIGHT TO CHARLES A. McLEOD, OF SAME PLACE.

IMPROVEMENT IN STOVE-OVENS.

Specification forming part of Letters Patent No. 200,975, dated March 5, 1878; application filed December 19, 1877.

*To all whom it may concern:*

Be it known that I, ESEK BUSSEY, of Troy, in the county of Rensselaer and State of New York, have invented certain new and useful Improvements in Ovens for Cooking-Stoves, of which the following is a specification:

The figure is a perspective view of a cook-stove, showing the present invention applied to the oven.

The design of the present invention is to effect such an improvement in the ovens of cooking-stoves that the same can, at will, be used a whole, or divided and used as two separate compartments or chambers, each of which shall, in part at least, be heated direct from the fire-pot, or by the flues immediately connected therewith; and to this end it consists in a movable and hinged plate applied to the inside of the oven, adapted to be fixed in any desired position, all as will now be set out and explained.

In the accompanying drawings, A denotes a cooking-stove of any usual or ordinary construction, and B its oven. In the present instance this oven is irregular in shape; but my invention is adapted equally to ovens of any shape and form.

To and upon the angle $a$ in the upper part of the oven, and made by the corner of the fire-box or its casing, is hinged the imperforate metal plate C. This is so adapted and fitted in its place that it can be turned into a horizontal position by means of knob $c$ upon the outside of the stove, and lie flat against the top plate of the oven and under the fire-box, or turned into a vertical position, and thus constitute a partition to divide the oven into two compartments or chambers.

The object and use of so dividing the oven are that there will be opportunity afforded to carry on the processes of cooking different articles of food at the same time with as much advantage as if two entirely different stoves or ovens were employed. Thus at the same time a fowl or a joint of meat can be roasted in one of said compartments, and pies can be baked in the other. The division-plate fitting snugly, there will be no inconvenience or harm to the viands in either compartment from the steam or flavor escaping from those in the other.

The plate can be readily applied to any stove now in use.

The knob $c$ is so fitted to and connected with the plate by means of an arm that the plate can be conveniently moved without opening the stove-door; but it is obvious that the plate could be quite easily manipulated if said knob-rack and arm were adapted inside of the oven, and were operated only when the oven-door was opened.

Any convenient means, such as a projection on the arm to which the knob $c$ is attached, operating on rack $c'$, may be adapted to hold said arm fixed in any position, and thus insure permanence in whatever place the said plate may be set.

I do not set up any claim to the division of an oven into an upper and lower chamber by a removable partition; nor, in such a division, to a multiplication of partitions and chambers in the oven; nor to the use of an independent and removable partition adapted to divide the oven at right angles to the fire-pot.

My invention is designed to cover a hinged and movable partition, which may be fixed in any position, and divides the oven vertically and transversely into separate chambers, each adapted to be highly heated.

I am aware that in double stoves ovens have been divided by a removable partition, in order to use one or the other part of the stove, and that, in some instances, several removable partitions have been used to make several chambers in the oven, and that the oven has sometimes been divided by a movable partition set at right angles to the fire-box; but in none of these cases has there been shown a partition adapted and arranged as mine, and that can be moved at will and fixed in any desired position.

Having thus described my invention, what I consider new, and desire to secure by Letters Patent, is—

The hinged and movable partition C, adapted to divide an oven vertically and transversely—that is, in a line parallel with the fire-box, and to be held in any desired position, in the manner described, substantially as and for the purposes set forth.

In testimony that I claim the foregoing as my own I affix my signature in presence of two witnesses.

ESEK BUSSEY.

Witnesses:
JAMES R. TORRANCE,
JOHN REARDON.